United States Patent
Petterson

(10) Patent No.: US 8,181,598 B2
(45) Date of Patent: May 22, 2012

(54) METHOD AND ARRANGEMENT FOR CONTROLLING THE MILKING BY A MILKING MACHINE

(75) Inventor: Torbjörn Petterson, Gnesta (SE)

(73) Assignee: DeLaval Holding AB, Tumba (SE)

( * ) Notice: Subject to any disclaimer, the term of this patent is extended or adjusted under 35 U.S.C. 154(b) by 936 days.

(21) Appl. No.: 12/222,263

(22) Filed: Aug. 6, 2008

(65) Prior Publication Data

US 2009/0064936 A1  Mar. 12, 2009

(30) Foreign Application Priority Data

Sep. 7, 2007 (SE) ...................................... 0702001

(51) Int. Cl.
*A01J 5/007* (2006.01)
*A01J 5/04* (2006.01)
(52) U.S. Cl. ................ 119/14.02; 119/14.08; 119/14.47
(58) Field of Classification Search ............... 119/14.02, 119/14.08, 14.14, 14.44, 14.47–14.53
See application file for complete search history.

(56) References Cited

U.S. PATENT DOCUMENTS

| | | | | |
|---|---|---|---|---|
| 3,773,016 A * | 11/1973 | Needham et al. | ........... | 119/14.08 |
| 4,211,184 A | 7/1980 | Abrahamson | | |
| 4,292,926 A * | 10/1981 | Tilman | ........ | 119/14.02 |
| 4,572,104 A * | 2/1986 | Rubino | ........ | 119/14.02 |
| 4,922,855 A * | 5/1990 | Tomizawa et al. | ........ | 119/14.15 |
| 5,141,403 A * | 8/1992 | Guo et al. | ........ | 417/45 |
| 5,218,924 A * | 6/1993 | Thompson et al. | ........ | 119/14.02 |
| 5,284,180 A * | 2/1994 | Guo et al. | ........ | 137/488 |
| 5,443,035 A * | 8/1995 | Lind et al. | ........ | 119/14.02 |
| 5,860,388 A * | 1/1999 | Tan et al. | ........ | 119/14.44 |
| 5,970,910 A * | 10/1999 | Grimm et al. | ........ | 119/14.02 |
| 6,164,242 A * | 12/2000 | Olofsson | ........ | 119/14.02 |
| 6,494,163 B1 * | 12/2002 | Oort | ........ | 119/14.1 |
| 6,601,535 B1 | 8/2003 | Röös et al. | | |
| 6,990,924 B2 * | 1/2006 | Brown et al. | ........ | 119/14.08 |
| 7,051,673 B2 * | 5/2006 | Brown et al. | ........ | 119/14.41 |
| 7,159,538 B2 * | 1/2007 | Innings | ........ | 119/14.08 |
| 2010/0121263 A1 * | 5/2010 | Farka et al. | ........ | 604/74 |

FOREIGN PATENT DOCUMENTS

| GB | 2 107 565 | 5/1983 |
|---|---|---|
| WO | WO 2005/102035 | 4/2005 |

OTHER PUBLICATIONS

PSA/ISA/201/SE International-Type Search Report dated Mar. 14, 2008.

* cited by examiner

*Primary Examiner* — Rob Swiatek
*Assistant Examiner* — Ebony Evans
(74) *Attorney, Agent, or Firm* — Young & Thompson

(57) ABSTRACT

A method and arrangement for controlling milking by a milking machine includes a teat cup having a flexible teat receiving liner arranged inside a teat cup shell. During milking, a vacuum is applied to a lower part of the interior of the teat receiving liner to draw milk from a teat therein while the flexible teat receiving liner is periodically opened and collapsed by application of a pulsating massage vacuum between the flexible teat receiving liner and the teat cup shell. A pressure sensor repeatedly measures a vacuum level in an upper part of the interior of the teat receiving line, and depending on the repeatedly measured vacuum level, the periodic opening and collapsing of the flexible teat receiving liner is interrupted by keeping the flexible teat receiving liner collapsed for a specific period of time.

23 Claims, 2 Drawing Sheets

METHOD AND ARRANGEMENT FOR CONTROLLING THE MILKING BY A MILKING MACHINE

PRIORITY STATEMENT

The present application hereby claims priority under 35 U.S.C. §119 on Swedish patent application number 0702001-9 filed Sep. 7, 2007, the entire contents of which is hereby incorporated herein by reference.

TECHNICAL FIELD OF THE INVENTION

The present invention relates generally to dairy farming and to milking of dairy animals therein. Particularly, the invention relates to a method and an arrangement for controlling the milking by a milking machine.

DESCRIPTION OF RELATED ART AND BACKGROUND OF THE INVENTION

In modern dairy farm industry there are continuous research and development activities in order to improve the efficiency of various activities such as machine milking, which, inter alia, involves increased milk yield and reduced milking time, while, naturally, ethical aspects as well as animal care are considered.

Machine milking, as known in the art, generally utilizes teat cups and vacuum sources to perform the milking function. In such systems each teat is contained within a teat cup having a teat receiving liner arranged within the teat cup next to the teat. A vacuum is applied to the interior of each receiving liner to draw the milk from the teat, with the teat receiving liners periodically opened and collapsed by application of a pulsating massage vacuum between the teat receiving liners and the inside of the teat cups. This periodic operation of the teat receiving liners results in the periodic flow of milk from the teats into a milk line, and constitutes the actual milking of the cow.

30-50% of the milking time is comprised of a latter phase of the milking when the milk flow is very low. One reason to the long milking time of such low milk flow phase is that the teat cups are creeping up on the teats of the animal which prevents appropriate milking.

SUMMARY OF THE INVENTION

It is an object of the present invention to provide a method and an arrangement for controlling the milking by a milking machine, by which the overall milk production can be increased.

It is in this respect a particular object of the invention to provide such a method and such an arrangement by which creeping of teat cups up on the teats is avoided and by which the milking times can be considerably shortened.

It is a further object of the invention to provide such a method and such an arrangement, by which milking animals can be fully emptied from milk.

It is yet a further object of the invention to provide such a method and such an arrangement, by which the animal care and treatment are improved.

It is a further object of the invention to provide such a method and such an arrangement, which are accurate, precise, efficient, reliable, of low cost, and easy to implement.

These objects, among others, are attained by methods and arrangement as defined in the appended patent claims.

According to a first aspect of the invention there is provided a method for controlling the milking by a milking machine, which comprises at least one teat cup having a flexible teat receiving liner arranged inside a teat cup shell, wherein, during milking, a vacuum is applied to a lower interior part of the teat receiving liner to draw milk from a teat received therein while the teat receiving liner is periodically opened and collapsed by application of a pulsating massage vacuum between the teat receiving liner and the teat cup shell. The method comprises the steps of measuring repeatedly a vacuum level in an upper interior part of the teat receiving liner, and, depending on the repeatedly measured vacuum level, interrupting the periodic opening and collapsing of the teat receiving liner by keeping the teat receiving liner collapsed.

The vacuum level should preferably be measured in an inner annular cavity of the teat receiving liner beneath the teat receiving opening thereof.

The interruption of the periodic opening and collapsing is preferably performed in a latter phase of the milking when the milk flow is low and when there is a risk that the teat cup creeps up on the teat and renders further milking impossible. This is typically obtained when the milk ducts and milk cisterns of the udder start becoming empty from milk. In such a case the teat receiving liner is kept collapsed for a given period of time, e.g. about 1 to 10 seconds, in order to allow milk to refill the milk ducts and milk cisterns. Typically, the cistern milk is then emptied from the milking animal within a few periods of the periodic movement of the flexible teat receiving liner. At this time the vacuum level will again raise and the periodic movement will be interrupted once again or the milking will be terminated.

The interruption of the periodic opening and collapsing may alternatively, or additionally, be performed in an early phase of the milking when a high milk flow has yet not been established.

By means of the present invention the overall milk production is optimized. Faster milking is achieved and more milk is produced, simultaneously as the animal care is improved.

Several embodiments of the invention illustrate different trigger mechanisms for when exactly the periodic opening and collapsing should be interrupted.

According to a second aspect of the invention there is provided an arrangement for implementing the above method. The arrangement comprises a pressure sensor provided for measuring the vacuum level and means provided for interrupting the periodic opening and collapsing of the teat receiving liner. The interrupting means may be a valve in the teat cup shell which opens to thereby collapse the teat cup liner, or the pulsator or pump arrangement of the milking machine may be arranged for lowering the vacuum between the teat receiving liner and the teat cup shell.

Further, a control device connected to the pressure sensor for receiving the repeatedly measured vacuum level and connected to the interrupting means in order to control the operation thereof may be provided. The control device comprises preferably a decision algorithm for determining when the periodic opening and collapsing of the flexible teat receiving liner shall be interrupted.

Alternatively, a simple mechanic or electro-mechanic regulator device may actuate a valve in the teat cup shell in response to the repeatedly sensed vacuum level.

Advantageously, the above method and arrangement are implemented separately for each teat cup of the milking machine since each udder portion of the milking animal is a separate milk production unit.

Further characteristics of the invention and advantages thereof, will be evident from the detailed description of preferred embodiments of the present invention given hereinafter and the accompanying FIGS. 1-3, which are given by way of illustration only and are thus not limitative of the present invention.

DETAILED DESCRIPTION OF EMBODIMENTS

Figure 1:
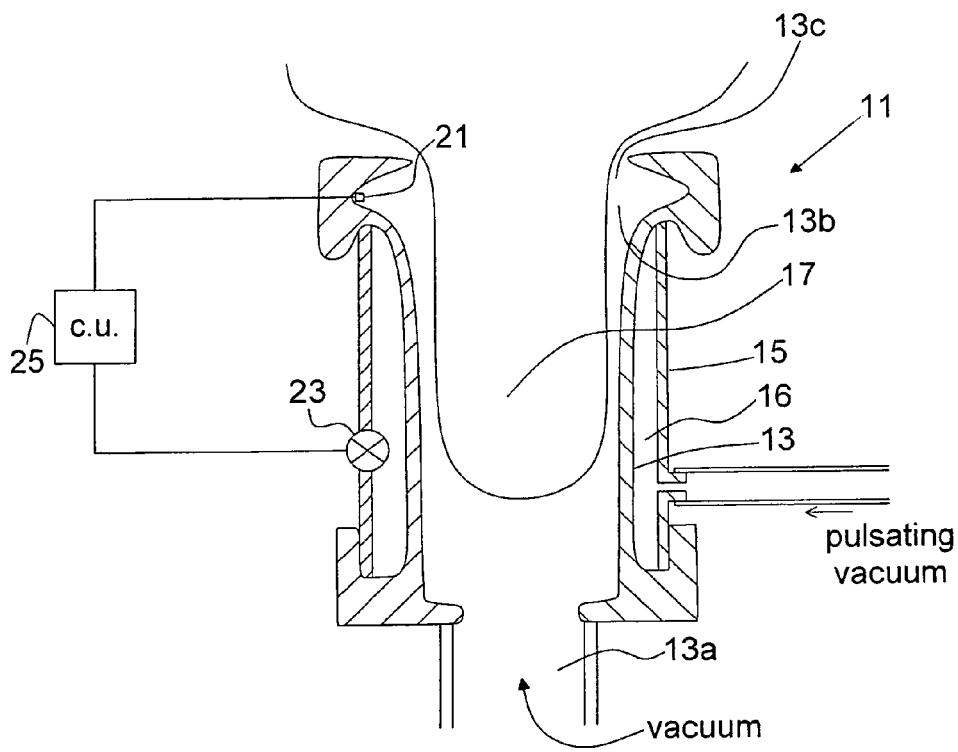
FIG. 1 illustrates schematically, in a cross sectional view, a teat cup of a milking machine and an arrangement for controlling the milking according to an embodiment of the invention.

FIG. 1 illustrates an arrangement for controlling the milking by a milking machine, which comprises at least one teat cup 11 having a flexible teat receiving liner 13 arranged inside a teat cup shell 15. During milking a vacuum is applied to a lower interior part 13a of the teat receiving liner 13 to draw milk from a teat 17 received through a teat receiving opening 13c at an upper end of the teat receiving liner 13 while the teat receiving liner 13 is periodically opened and collapsed by application of a pulsating massage vacuum between the teat receiving liner 13 and the teat cup shell 15.

The inventive arrangement for controlling the milking comprises a pressure sensor 21, means 23 for interrupting the periodic opening and collapsing of the teat receiving liner 13, and a control device 25.

The pressure sensor 21 is provided for repeatedly, preferably continuously, measuring a vacuum level in an upper interior part 13b of the teat receiving liner 13. Preferably, the pressure sensor 21 is located in an inner annular cavity formed beneath the teat receiving opening 13c as being illustrated.

The interrupting means 23 is provided for interrupting the periodic opening and collapsing of the teat receiving liner 13 by instantaneously collapsing the teat receiving liner 13. The interrupting means 23 may be a valve in the teat cup shell which opens to thereby collapse the teat cup liner as being illustrated in FIG. 1.

The control device 25 is connected to the pressure sensor 21 for receiving the repeatedly measured vacuum level and connected to the interrupting means 23 in order to control the operation thereof. The control device 25 comprises a decision algorithm for determining, inter alia, when the periodic opening and collapsing of the teat receiving liner 13 shall be interrupted.

Figure 2:
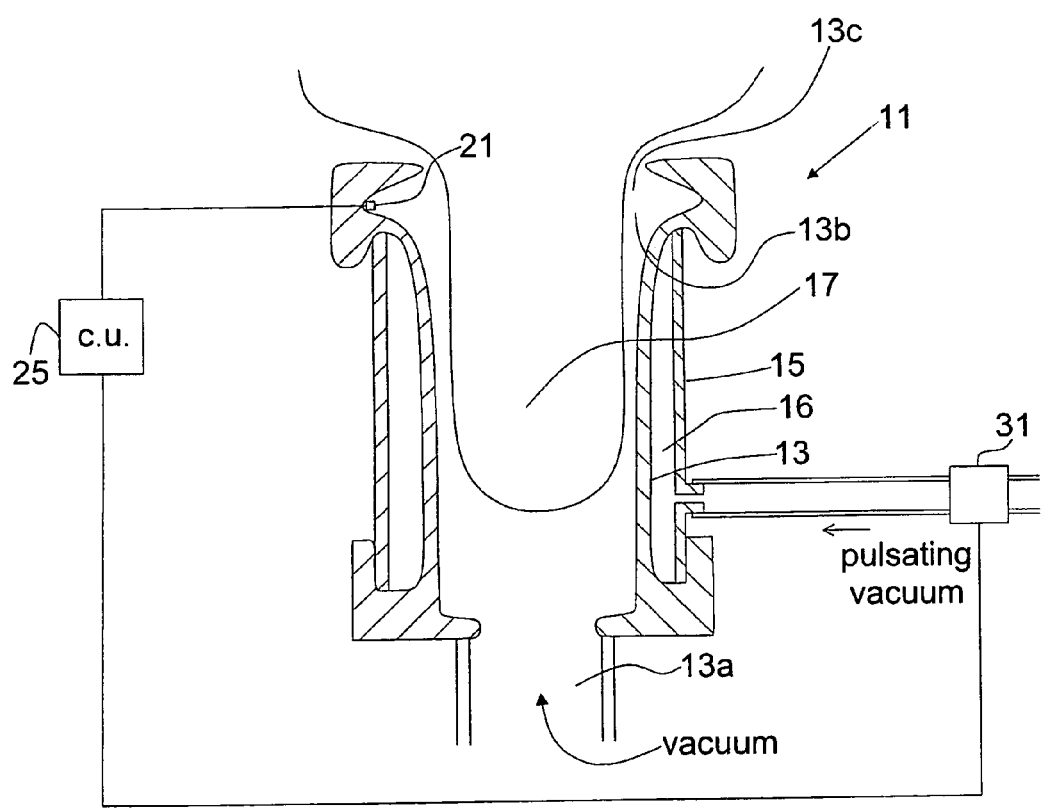
FIG. 2 illustrates schematically, in a cross sectional view, a teat cup of a milking machine and an arrangement for controlling the milking according to an alternative embodiment of the invention.

Alternatively, the pulsator or pump arrangement of the milking machine may be arranged for applying atmospheric pressure or for lowering the vacuum between the teat receiving liner 13 and the teat cup shell 15. Such an embodiment is illustrated in FIG. 2. The pressure sensor 21 is connected to the control device 25, which here is connected to the pulsator 31 in order to control the operation thereof. The pulsator 31 is controlled to act as the interrupting means in accordance with the above.

Figure 3:
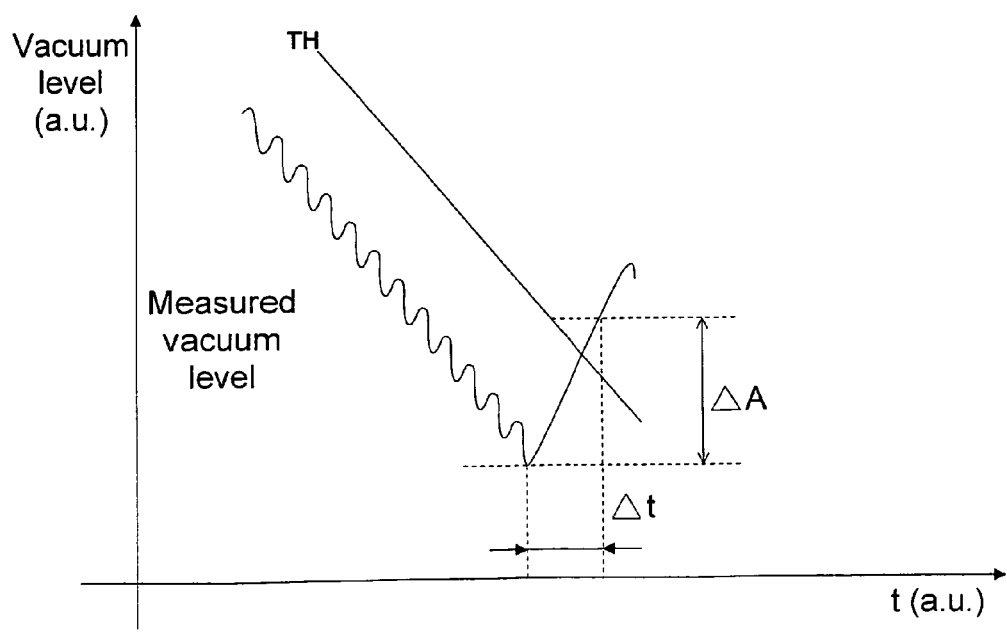
FIG. 3 is an example diagram of the vacuum level in the interior upper part of a flexible teat receiving liner of a teat cup as a function of milking time.

In FIG. 3 is shown an example diagram of vacuum level in the interior upper part of a flexible teat receiving liner of a teat cup as a function of milking time. The vacuum level is increased momentarily when the flexible teat receiving liner 13 is opened and is slowly lowered when the flexible teat receiving liner 13 is collapsed. During high milk flows the measured vacuum level is relatively low. When the cistern milk is running short a considerable increase in the vacuum level occurs. This should be detected and the periodic opening and collapsing of the teat receiving liner 13 should preferably be interrupted before the teat cup 11 creeps up on the teat of the milking animal and prevents any further milk extraction.

The interruption of the opening and collapsing of the teat receiving liner 13 is thus preferably performed during a latter phase of the milking.

However, the interruption of the opening and collapsing of the teat receiving liner 13 may be performed in an early phase of the milking when a high milk flow has yet not been established in order to fastly achieve the high milk flow. The interruption of the opening and collapsing of the teat receiving liner 13 could here be an alternative to the use of a lower vacuum, which may have the drawbacks of teat cup slips or teat cup fall-offs.

In one embodiment of the invention the periodic opening and collapsing of the teat receiving liner 13 is interrupted depending on whether the repeatedly measured vacuum level, optionally after having been processed, e.g. low pass filtered, increases by a certain specific amount. The certain specific amount may be defined as an absolute or percentage vacuum level increase as calculated from a lowest measured vacuum level. An example of such certain specific amount is indicated by $\Delta A$ in FIG. 3.

In another embodiment of the invention the periodic opening and collapsing of the teat receiving liner 13 is interrupted depending on whether the repeatedly measured vacuum level, optionally after having been processed, increases by a certain specific speed. The certain specific speed may be defined as a certain specific temporal vacuum level derivative. An example of such derivative is indicated by $\Delta A/\Delta t$ in FIG. 3.

In yet another embodiment the periodic opening and collapsing of the teat receiving liner 13 is interrupted depending on whether the repeatedly measured vacuum level, optionally after having been processed, exceeds a threshold value. The threshold value may vary during the milking to obtain a threshold curve. An example of such a curve is indicated by TH in FIG. 3.

The vacuum level criteria for when the periodic opening and collapsing of the teat receiving liner 13 shall be interrupted may be determined during the milking or may be preset before the milking begins.

The flexible teat receiving liner is advantageously kept collapsed for a selected period of time such as e.g. between about 1 and 10 seconds. When this period of time has lapsed the periodic opening and collapsing of the flexible teat receiving liner is restarted and the vacuum level measurements and the conditional interruption are repeated.

The selected period of time may be dependent on how fast or how much the measured vacuum level is increased. For instance, if the measured vacuum level increases much or fast, the teat receiving liner is kept collapsed for a long time, whereas if the measured vacuum level increases less or slower, the teat receiving liner is advantageously kept collapsed for a shorter time.

By means of the present invention the milk yield is increased considerably in a latter phase of the milking. If the interruption of the periodic opening and collapsing of the teat receiving liner is performed in an early phase of the milking a high milk flow can be established faster. The composition of the milk, in particular the fat content, is influenced by the efficiency of the milk removal. When the farmer is paid according to the fat content of the milk it is significant to empty the udder as completely as possible, since the last portion of the milk has the highest fat content.

Further, efficient milk removal results in a higher milk production. The milk contains a substance which acts with a negative feed back control on the milk secreting cells. Therefore, in order not to inhibit milk secretion, the alveoli should be emptied as completely as possible.

It shall be appreciated that the present invention may be performed independently for each udder portion. In case the milking animals are cows the milking machine comprises four teat cups of the above kind. A vacuum level in an upper part of the interior of the flexible teat receiving liner of each of the four teat cups is repeatedly measured, and the periodic opening and collapsing of the flexible teat receiving liner of each of the teat cups is interrupted depending on the repeatedly measured vacuum level in that teat cup, wherein the interruption is performed by immediately collapsing the flexible teat receiving liner of that teat cup. The flexible teat receiving liner of each of the teat cups is kept collapsed during a respective period of time before the periodic opening and closing is restarted.

The embodiment of FIG. 1 seems to be of particular importance since it can be implemented on an udder portion individual basis independently of the number of pulsators used. The embodiment can be employed on an udder portion individual basis in existing milking equipment wherein a single pulsator is used for a plurality of teat cups.

What is claimed is:

1. A method for controlling the milking of an animal by a milking machine comprising at least one teat cup having a flexible teat receiving liner arranged inside a teat cup shell, wherein, during milking, a vacuum is applied to a lower part of the interior of the flexible teat receiving liner to draw milk from a teat received therein while the flexible teat receiving liner is periodically opened and collapsed by application of a pulsating massage vacuum between the flexible teat receiving liner and the teat cup shell, said method comprising the steps of:
   measuring repeatedly a vacuum level in an upper part of the interior of the flexible teat receiving liner;
   depending on said repeatedly measured vacuum level, interrupting said periodic opening and collapsing of the flexible teat receiving liner by keeping the flexible teat receiving liner collapsed for a period of time in order to allow milk to refill milk ducts and milk cisterns of the animal, said teat cup remaining in place on said teat during said interrupting of said periodic opening and collapsing of the flexible teat receiving liner by keeping the flexible teat receiving liner collapsed; and
   after said period of time has lapsed, restarting the periodic opening and collapsing of the flexible teat receiving liner,
   wherein said measuring, interrupting, and restarting steps are repeated during the milking.

2. The method of claim 1, wherein said periodic opening and collapsing of the flexible teat receiving liner is interrupted depending on whether said repeatedly measured vacuum level increases by a specific amount.

3. The method of claim 2, wherein said specific amount is defined as an absolute or percentage vacuum level increase as calculated from a lowest measured vacuum level.

4. The method of claim 1, wherein said periodic opening and collapsing of the flexible teat receiving liner is interrupted depending on whether said repeatedly measured vacuum level, after having been processed, increases by a specific amount.

5. The method of claim 4, wherein said processing of the repeatedly measured vacuum level comprises low pass filtering said repeatedly measured vacuum level.

6. The method of claim 1, wherein said periodic opening and collapsing of the flexible teat receiving liner is interrupted depending on whether said repeatedly measured vacuum level increases by a specific speed.

7. The method of claim 6, wherein said specific speed is defined as a specific temporal vacuum level derivative.

8. The method of claim 1, wherein said periodic opening and collapsing of the flexible teat receiving liner is interrupted depending on whether said repeatedly measured vacuum level, after having been processed, increases by a specific speed.

9. The method of claim 1, wherein said periodic opening and collapsing of the flexible teat receiving liner is interrupted depending on whether said repeatedly measured vacuum level exceeds a threshold value.

10. The method of claim 9, wherein said threshold value is adjusted or changed during the milking.

11. The method of claim 1, wherein said periodic opening and collapsing of the flexible teat receiving liner is interrupted depending on whether said repeatedly measured vacuum level, after having been processed, exceeds a threshold value.

12. The method of claim 1, wherein vacuum level criteria for when said periodic opening and collapsing of the flexible teat receiving liner shall be interrupted are determined during the milking.

13. The method of claim 1, wherein said interrupting and restarting steps are performed during a latter phase of the milking and continued until the milking is complete.

14. The method of claim 13, wherein the period of time is a selected period of time.

15. method of claim 14, wherein said selected period of time is between about 1 and 10 seconds such that said restarting step begins between about 1 and 10 seconds after said interrupting of said periodic opening and collapsing of the flexible teat receiving liner by keeping the flexible teat receiving liner collapsed.

16. The method of claim 1, wherein said flexible teat receiving liner has a teat receiving opening at an upper end thereof, and said vacuum level is repeatedly measured in an inner annular cavity beneath said teat receiving opening.

17. The method of claim 1, wherein said method is performed in a milking machine comprising four teat cups, each of which having a flexible teat receiving liner arranged inside a teat cup shell, wherein, during milking, a vacuum is applied to a lower part of the interior of the flexible teat receiving liner of each of the teat cups to draw milk from a teat received therein while the flexible teat receiving liner is periodically opened and collapsed by application of a pulsating massage vacuum between the flexible teat receiving liner and the teat cup shell, said method comprising the steps of:
   measuring repeatedly a vacuum level in an upper part of the interior of the flexible teat receiving liner of each of the four teat cups; and
   for each of the four teat cups, depending on the repeatedly measured vacuum level in that teat cup, interrupting said periodic opening and collapsing of the flexible teat receiving liner of that teat cup by keeping the flexible teat receiving liner of that teat cup collapsed for a period of time in order to allow milk to refill milk ducts and milk cisterns of the animal, said that teat cup remaining in place on said teat during said interrupting said periodic opening and collapsing of the flexible teat receiving liner by keeping that flexible teat receiving liner collapsed; and after said period of time has lapsed, restarting the periodic opening and collapsing of that said flexible teat receiving liner,
wherein said measuring, interrupting, and restarting steps are repeated during the milking.

18. An arrangement for controlling the milking of an animal by a milking machine comprising at least one teat cup having a flexible teat receiving liner arranged inside a teat cup shell, wherein, during milking, a vacuum is applied to a lower part of the interior of the flexible teat receiving liner to draw milk from a teat received therein while the flexible teat receiving liner is periodically opened and collapsed by application of a pulsating massage vacuum between the flexible teat receiving liner and the teat cup shell, said arrangement comprising:
- a pressure sensor provided for measuring repeatedly a vacuum level in an upper part of the interior of the flexible teat receiving liner;
- a control device connected to the pressure sensor for receiving the repeatedly measured vacuum level; and
- an interrupting unit connected to the control device, the interrupting unit operative, under control of the control device, to interrupt the periodic opening and collapsing of the teat receiving liner by collapsing the teat receiving liner, said teat cup remaining in place on said teat during said interrupting said periodic opening and collapsing of the flexible teat receiving liner by keeping the flexible teat receiving liner collapsed,
wherein, depending on said repeatedly measured vacuum level, said control device operates to i) control said interrupting unit for interrupting said periodic opening and collapsing of the flexible teat receiving liner by keeping the flexible teat receiving liner collapsed for a period of time in order to allow milk to refill milk ducts and milk cisterns of the animal, and ii) after said period of time has lapsed, restarting the periodic opening and collapsing of the flexible teat receiving liner, the control device repeating the measuring, interrupting, and restarting during the milking.

19. The arrangement of claim 18, wherein said flexible teat receiving liner has a teat receiving opening at an upper end thereof, and said pressure sensor is arranged to measure repeatedly the vacuum level in an inner annular cavity beneath said teat receiving opening.

20. The arrangement of claim 18, wherein said means for interrupting is any of a valve, pulsator, or pump device.

21. The arrangement of claim 18, wherein said control device comprising a decision algorithm for determining when said periodic opening and collapsing of the flexible teat receiving liner shall be interrupted.

22. The arrangement of claim 18, wherein said control device comprises a decision algorithm for determining the period of time, during which the flexible teat receiving liner shall be kept collapsed.

23. The arrangement of claim 18, wherein,
the period of time is a selected period of time, and
the selected period of time is between about 1 and 10 seconds such that said control device restarts the periodic opening and collapsing of the flexible teat receiving liner between about 1 and 10 seconds after interrupting the periodic opening and collapsing of the flexible teat receiving liner, the control device repeating the measuring, interrupting, and restarting until the milking is completed.

* * * * *